United States Patent [19]
Kormos et al.

[11] Patent Number: 5,598,207
[45] Date of Patent: Jan. 28, 1997

[54] CAMERA POINTING MECHANISM USING PROXIMATE MAGNETIC SENSING

[75] Inventors: Alex L. Kormos, Los Angeles; David M. Masarik, Laguna Beach; Paul R. Salvio, Palos Verdes Estates, all of Calif.

[73] Assignee: Hughes Electronics, Los Angeles, Calif.

[21] Appl. No.: 226,791

[22] Filed: Apr. 12, 1994

[51] Int. Cl.$^6$ ................................................ H04N 5/225
[52] U.S. Cl. .................................... 348/148; 348/373
[58] Field of Search .................................... 348/211, 373, 348/151, 143, 148

[56] References Cited

U.S. PATENT DOCUMENTS

| | | | |
|---|---|---|---|
| 3,689,695 | 9/1972 | Rosenfield et al. | 348/148 |
| 4,233,634 | 11/1980 | Adams | 348/373 |
| 4,949,108 | 8/1990 | Verret | 348/373 X |
| 5,128,770 | 7/1992 | Inana et al. | 348/373 X |
| 5,220,848 | 7/1993 | Basilico | 348/211 X |

*Primary Examiner*—Wendy Garber
*Attorney, Agent, or Firm*—Michael W. Sales; Wanda K. Denson-Low

[57] ABSTRACT

A low profile, low cost pointing mechanism for an imaging system. The inventive pointing mechanism (500) includes a mechanism (502, 504) for supporting the imaging system so that it is movable from a first pointing angle to a second pointing angle. A second mechanism (570, 580, 584, 542) is included for driving the supporting mechanism (502, 504) to change the pointing angle thereof in response to signals from a control system. In a preferred embodiment, the inventive pointing mechanism (500) includes a tilt gimbal (502) located at the center of gravity of the imaging system and a pan gimbal (504). The pan and tilt gimbals (502, 504) are driven by pan and tilt stepper motors (542, 526) in response to commands from a joystick (568) on a remote control unit (566).

9 Claims, 3 Drawing Sheets

CAMERA POINTING MECHANISM USING PROXIMATE MAGNETIC SENSING

BACKGROUND OF THE INVENTION

1. Field of the Invention

The present invention relates to pan and/or tilt mechanisms for any systems requiring pointing mechanisms.

2. Description of the Related Art

Night vision systems are well known in the art. Night vision systems typically include a cryogenically cooled linear detector array with an associated cryogenic subsystem, a scanning system which moves the array across a two-dimensional field, and a refractive optical system which focuses energy onto the detector. The detectors in the array either sense the heat of a body or detect low light levels.

While these systems have been used for military applications, the high cost of the scanning, cooling and optical systems associated therewith has heretofore limited the applicability of same for numerous other applications. Accordingly, there has been a need in the art for a low cost night vision system.

U.S. patent application Ser. No. 08/232,893, entitled "LOW COST NIGHT VISION CAMERA" filed herewith by S. H. Klapper et al. discloses and claims a low cost camera for night vision systems including a focal plane array of uncooled detectors and an optically fast, optical arrangement for focusing energy from an input aperture onto the array. The array includes a plurality of pyroelectric detectors which in the illustrative embodiment are fabricated of barium-strontium-titanate material.

Exploitation of the low cost camera for certain applications, requires an inexpensive pan and tilt mechanism with, ideally, a low profile. One such application involves law enforcement for which roof mounted night vision systems would be desirable. For this application, the mounting position of any night vision system must be high enough to view over the top of any light bar on the vehicle. However, the system must be mounted low enough that it does not present a height hazard when the vehicle is driven under low overhangs, parking structures, bridges and the like. Accordingly, in general, the currently preferred maximum height above the vehicle is 9.5 inches.

Unfortunately, conventional tilt mechanisms mount to the bottom of the camera and thereby force the camera to have a high profile. In addition, conventional pan and tilt mechanisms tend to be mechanically complicated and costly.

Thus, a need remains in the art for an inexpensive and reliable electro-mechanical pan and tilt mechanism for a night vision system having a low profile.

SUMMARY OF THE INVENTION

The need in the art is addressed by the present invention which provides a low profile, low cost pointing mechanism for an imaging system. The inventive pointing mechanism includes a mechanism for supporting the imaging system so that it is movable from a first pointing angle to a second pointing angle. A second mechanism is included for driving the supporting mechanism to change the pointing angle thereof in response to signals from a control system.

In a preferred embodiment, the inventive pointing mechanism includes a tilt gimbal and a pan gimbal. The pan and tilt gimbals are driven by pan and tilt stepper motors in response to commands from a joystick on a remote control unit. In a law enforcement application, the remote control unit is located in a law enforcement vehicle and permits an operator to change the pointing angle of the imaging system without leaving the vehicle. Power is provided to the imaging system and video signals are communicated from the imaging system by a slip ring and brush block assembly. Video signals from the imaging system are displayed on a monitor inside the vehicle. The system thereby provides enhanced vision to the occupants of the vehicle in darkness rain, snow, haze and fog conditions.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
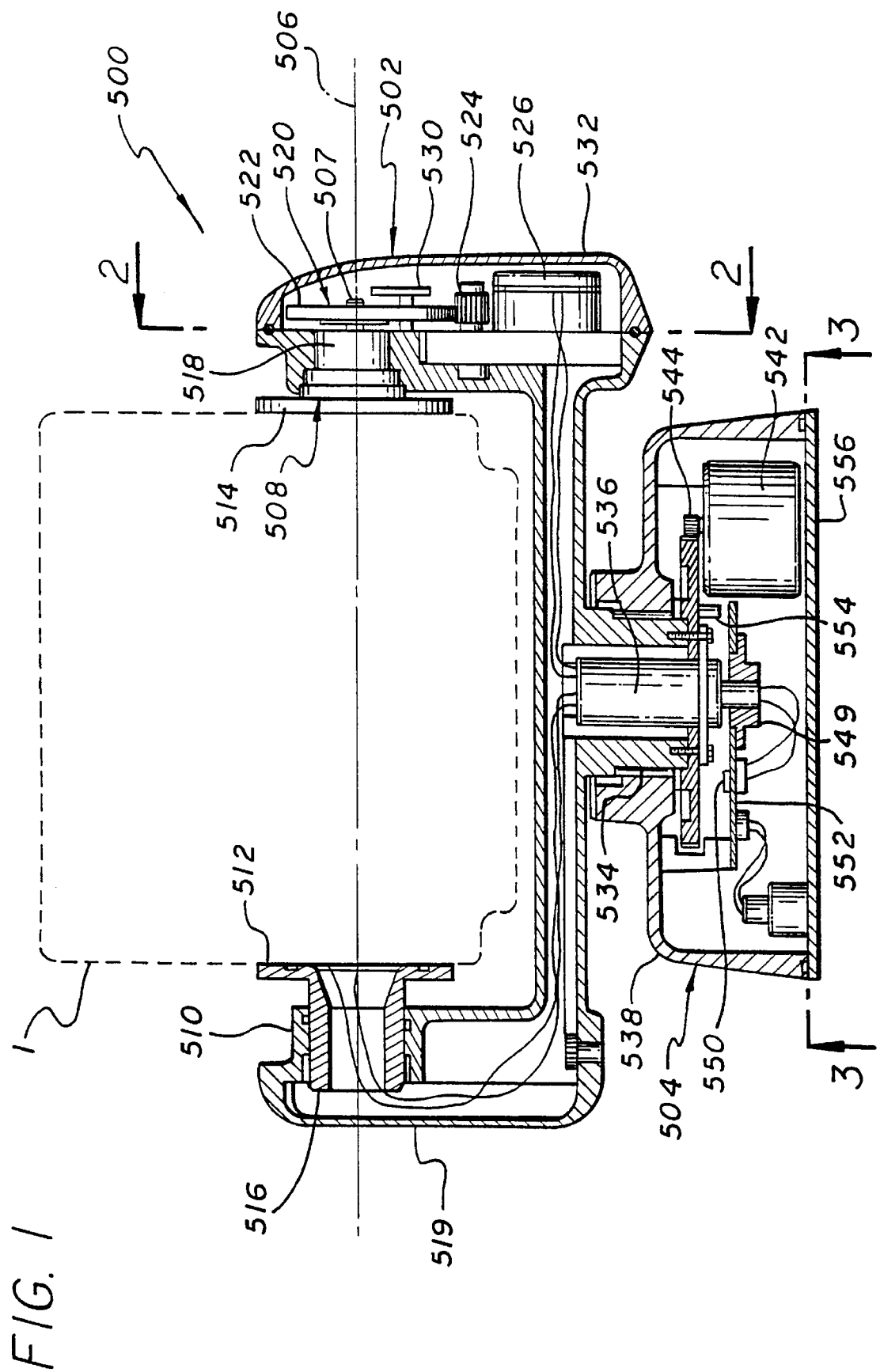
FIG. 1 is front sectional view of the inventive pointing mechanism.

FIG. 1 is front sectional view of the inventive pointing mechanism. The mechanism 500 is adapted for use with a night vision system 1 (shown in phantom) preferably implemented with an array of uncooled detectors such as barium-strontium-titanate detectors currently manufactured by Texas Instruments. The night vision system 1 is disclosed and claimed in U.S. patent application Ser. No. 08/232,893, entitled "LOW COST NIGHT VISION CAMERA", filed herewith by Stuart H. Klapper et al.

The inventive pointing mechanism 500 includes a tilt gimbal 502 and a pan gimbal 504. The tilt gimbal 502 provides an axis of rotation 506 in elevation which extends through the center of gravity of the night vision system 1. This allows for a low profile for the night vision system 1 on the pointing mechanism. The night vision system 1 is mounted on a floating tilt 508 which is supporting within a tilt gimbal housing 510. The floating tilt 508 has first and second trunnions 512 and 514 secured to opposite sides of the night vision system 1 about the center of gravity thereof. The first and second trunnions 512 and 514 are coupled to first and second tilt bearings 516 and 518, respectively. The first trunnion 512 and the first tilt bearing 516 are hollow to allow a feed of wires to and from the night vision system 1 therethrough. A first cover 519 covers the open end of the tilt gimbal 502. A motorized tilt drive assembly 520 is disposed at the second end of the tilt gimbal 502.

Figure 2:
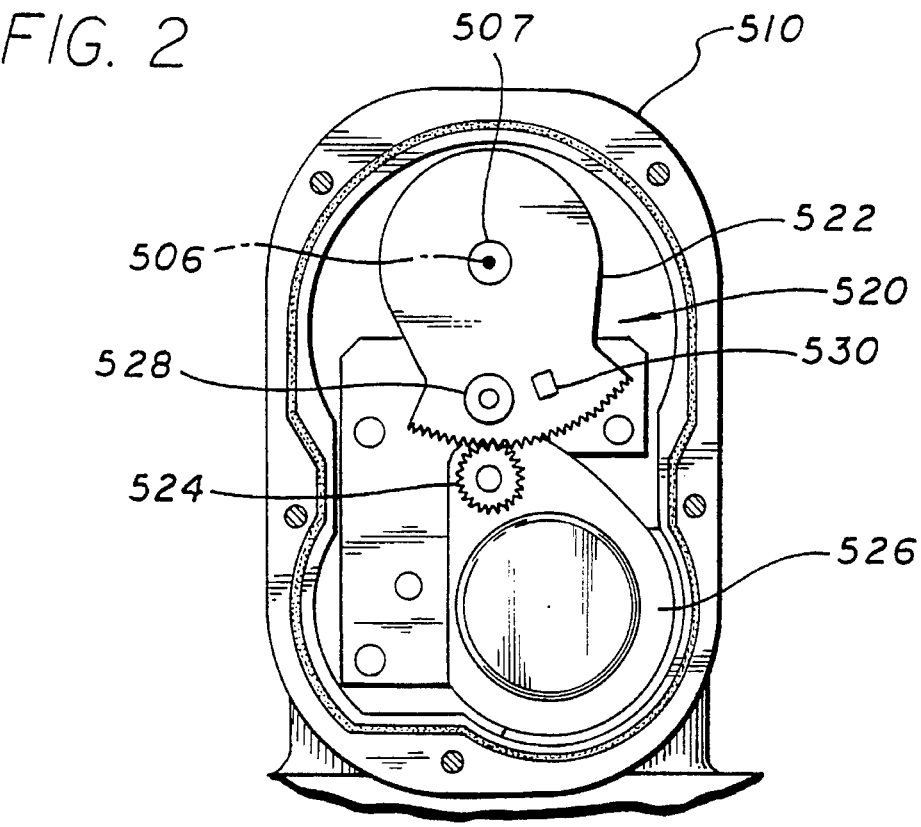
FIG. 2 is a side view of the pointing mechanism of the present invention with the cover removed to provide a front view of the tilt drive assembly.

FIG. 2 is a side view of the pointing mechanism 500 of the present invention with the cover removed to provide a front view of the tilt drive assembly 520. As shown in FIG. 2, the tilt drive assembly 520 includes a tilt drive gear 522 mounted for pivotal movement about the tilt axis 506 on a tilt shaft 507 which rotates therewith. The tilt drive gear 522 is driven by the tilt motor gear 524 of the tilt motor 526. In accordance with the present teachings, the tilt motor 526 is implemented with a stepper motor and gear box to provide sufficient torque in a compact package. The position of a magnet 528, mounted on the tilt gear 522, is detected by a Hall effect sensor 530. Three Hall effect sensors are mounted on a tilt electronics printed wiring board (PWB) 531 to provide an indication of the position of the tilt drive gear 522. Hall effect sensors are well known in the art. The Hall effect output establishes the limits of travel at each extreme so that the tilt gimbal 502 can be disabled at angular extremes. In the illustrative embodiment, one Hall effect device indicates center of travel while two others indicate clockwise and counterclockwise limits of gear travel. Other devices may be used to detect the tilt position of the night vision without departing from the scope of the present teachings.

The tilt control printed wiring board module 531 encases tilt control electronics (discussed below) behind the tilt drive gear 522. The tilt drive assembly 520 is enclosed by a second cover 532.

The tilt gimbal housing 510 is mounted on a pan bearing 534 so that the tilt gimbal and the night vision system 1 can rotate in azimuth. A conventional commercial slip ring and brush assembly 536 allows for the application of power and control signals to the night vision system 1 and to the tilt motor 526 and for the communication of video signals from the night vision system 1. The slip ring assembly 536 allows for 360 degree rotation and may be purchased from the Airflute Company in Bayonne N. J. by way of example. The pan bearing 534 seats within the pan housing 538. A pan drive assembly 540 is also provided within the pan housing 538.

Figure 3:
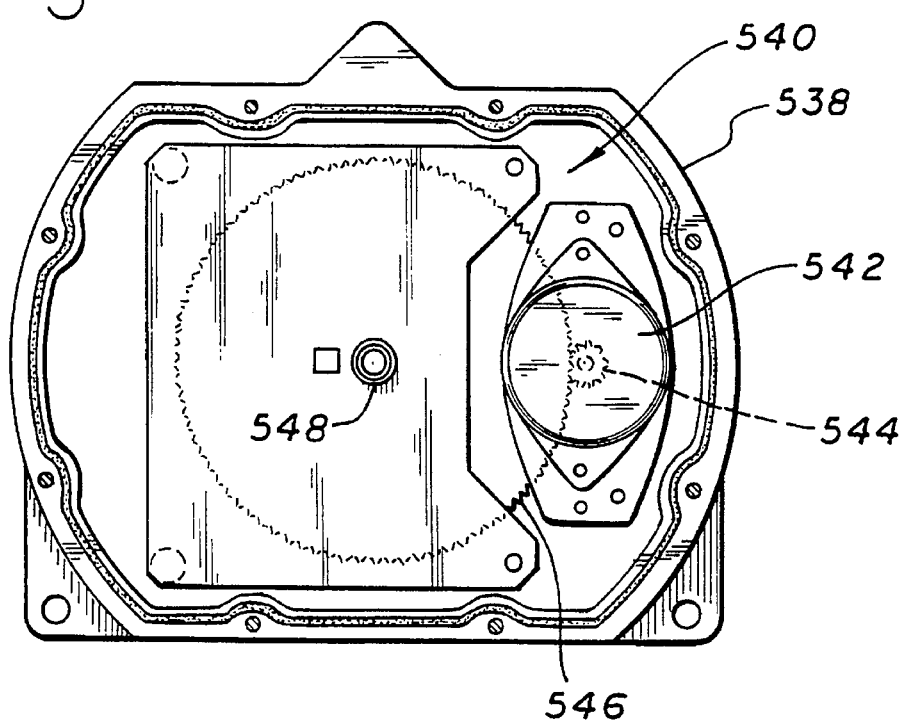
FIG. 3 is a bottom view of the pointing mechanism of the present invention with the bottom cover removed to show the pan drive mechanism.

FIG. 3 is a bottom view of the pointing mechanism of the present invention with the bottom cover removed to show the pan drive mechanism. As depicted in FIG. 3, the pan drive assembly 540 includes a pan drive motor 542 which, in the preferred embodiment, is implemented with a stepper motor having an integral pinion on the motor output shaft. A single pan drive motor gear 544 drives a pan gear 546 which is rigidly attached to a hollow pan shaft 534. The pan drive motor 542 may be purchased from Haydon Switch and Instrument Inc., in Waterbury, Conn. The use of a stepper motor with single pan drive motor gear 544 provides torque without a complex gear box and thus long life. The pan shaft 548 is attached to the slip ring and brush assembly 536.

As illustrated in FIG. 1, a Hall effect sensor 550 mounted on a pan control printed wiring board module 552 provides for forward position reference detection of a magnet 554 located on the pan gear 546. The fixed end of the slip ring and brush assembly 536 extends through a snugger 549 located on the printed wiring control module 552. The snugger 549 is a grommet which allows some motion of the base of the slip ring and brush assembly 536 as the pan module is rotated. In effect, the one end of the slip ring 548 and brush assembly 536 free floats so there is no overconstraining of the assembly which could create wear in the bearings of the slip ring and brush assembly 536. The pan control printed wiring control module 552 contains the pan control electronic circuit. The pan housing 538 has a bottom cover 556.

Figure 4:
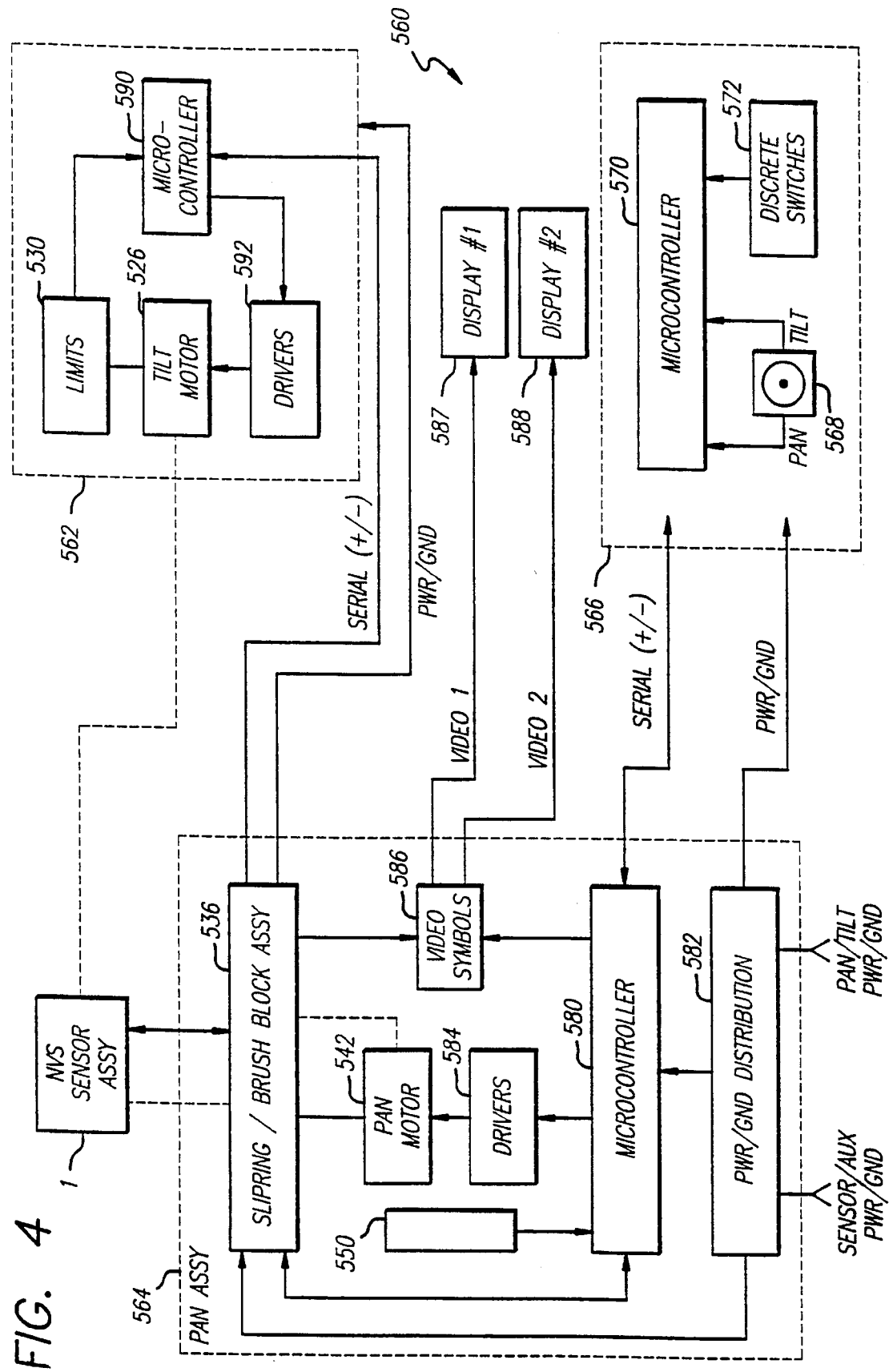
FIG. 4 is a block diagram of a preferred embodiment of the electrical system of the pointing mechanism of the present invention.

FIG. 4 is a block diagram of a preferred embodiment of the electrical system of the pointing mechanism of the present invention. The electrical system 560 includes a tilt circuit 562 and a pan circuit 564. The tilt circuit 562 is mounted on the tilt PWB 531. The pan circuit 564 is mounted on the pan PWB 552.

A remote control unit 566 includes a joystick 568, a microcontroller 570 and a set of discrete switches 572. The switches 572 provide power on/off, image polarity switching, wiper control, fixed forward look ahead and scan angle setting and initiation. Image polarity switching allows for "black hot" or "white hot" operation. The wiper control effects the operation of an optional wiper (not shown) on the night vision system 1. The "fixed forward look ahead" switch returns the night vision to a predetermined pointing angle for fast and easy location reference. The scan angle switch operates with the joystick 568 to fix the pan scan angles of the system 500. For example, when the joystick 568 is moved to the forward position while the scan angle switch is set, the remote microcontroller 570 stores the instantaneous pan scan angle as one of two scan limit angles. The other scan limit angle is set in the same manner. A single scan angle results in continuous 360 degree panning.

The scan speed can be modified by the operator once scan mode is initiated by jogging the pan joystick axis left or right for decreased scan speed and increased scan speed, respectively. The tilt angle can also be modified with the tilt joystick during scan mode.

In the normal mode of operation, the remote microcontroller 570, which may be implemented with a conventional microprocessor, converts analog voltages for pan and tilt from the joystick 568 to clockwise, counterclockwise and up and down digital serial commands for pan and tilt, respectively. The commands are transmitted to the pan microcontroller 580 and used to drive the tilt gimbal 510. In addition, tilt commands are passed through the pan microcontroller 580 to the tilt circuit 562 and used to drive the tilt gimbal drive trunnion 514.

The pan microcontroller 580 provides pan control commands to a driver circuit 584 which generates the appropriate number of square pulses at the appropriate rate to drive the pan motor 542. The position sensor symbology is checked and reset each time the sensor passes through the fixed forward zero position by use of the Hall effect sensor 550. The Hall effect sensor 550 provides position signals to the pan microcontroller which, in turn, provides addresses based on pointing angle to a video symbols buffer 586 in which video signals from the night vision system 1 are stored for display. The output of the video symbols buffer 586 is electronically summed onto the video signals from the NVS and provided to first and second displays 587 and 588.

The serial tilt commands are passed to a tilt microcontroller 590. The tilt controller 590 commands the tilt motor 526 to move in a desired direction at a desired rate via a second driver circuit 592.

In the preferred embodiment, the pan gimbal is designed to rotate a continuous 360° (unlimited), the tilt unit has a maximum travel of approximately −22 degrees to +45 degrees for horizontal zero. As mentioned above, limit stops are provided by the Hall effect devices on the tilt gear assembly to protect the tilt assembly from damage due to over-rotation. The tilt axis can be extended easily by modifying the tilt gimbal design, if necessary.

Thus, the present invention has been described herein with reference to a particular embodiment for a particular application, pointing a thermal imaging camera. Those having ordinary skill in the art and access to the present teachings will recognize additional modifications applications and embodiments within the scope thereof. For example, the invention is not limited to the use of a joystick to provide position commands. Other input devices such as potentiometers or voice recognition modules may be used without departing from the scope of the invention. Nor is the invention limited to stepper motors. As a person skilled in the art could readily appreciate, other types of electromechanical drive mechanisms (e.g., dc gearhead, ac synchronous) could be used. In addition, the invention is not limited to use with law enforcement vehicles. The invention may be used in any systems that have to be pointed, such as search lights and visible cameras.

It is therefore intended by the appended claims to cover any and all such applications, modifications and embodiments within the scope of the present invention.

Accordingly,

What is claimed is:

1. For use with a car having a top, a mechanism for pointing an imaging system having a center of gravity, the mechanism comprising:

a tilt gimbal adaptable to support the imaging system and allow the imaging system to rotate about a first axis of rotation that extends through the center of gravity of the imaging system;

a pan gimbal supporting the tilt gimbal and rotating about a second axis of rotation;

a housing for supporting the pan gimbal and the tilt gimbal, the housing being mountable to the top of the car;

means, responsive to a first control signal, for rotating the pan gimbal;

means, responsive to a second control signal, for rotating the tilt gimbal; and means for generating the first and second control signals, wherein the means for rotating the pan gimbal includes a pan gear attached to the pan gimbal, a longitudinal axis of the pan gear being coaxial with the second axis of rotation; and an electric motor and at least one gear for allowing the electric motor to drive the tilt gear, wherein the means for rotating the pan gimbal further includes means for sensing the position of the pan gimbal, the sensing means including a magnetized portion on the pan gear and at least one magnetic sensor proximate the pan gear, and wherein the means for rotating the pan gimbal further includes a circuit board mounted proximate the pan gear and a circuit for driving the motor, the circuit and the at least one magnetic sensor being mounted on the board.

2. The mechanism of claim 1 wherein the tilt gimbal includes a pair of hollow trunions secured to the imaging system, each trunion having a longitudinal axis that is coaxial with the first axis of rotation, at least one of the trunions allowing electrical conductors from the imaging system to extend therethrough.

3. The mechanism of claim 2 wherein the pan gimbal includes a base and a pair of arms extending from opposite sides of said base, said arms supporting the trunions and allowing the trunions to revolve about the first axis of rotation.

4. The mechanism of claim 2 wherein the means for rotating the tilt gimbal includes a tilt gear attached to one of the trunions, an electric motor and at least one gear for allowing the electric motor to drive the tilt gear.

5. The mechanism of claim 4 wherein the means for rotating the tilt gimbal further includes means for sensing the position of the tilt gimbal, the sensing means including a magnetized portion on the tilt gear and at least one magnetic sensor proximate the tilt gear.

6. The mechanism of claim 5 wherein said sensing means includes three Hall effect sensor, two of the Hall effect sensors indicating extreme positions of travel of the tilt gimbal, one of the Hall effect sensors indicating a center of travel of the tilt gimbal.

7. The mechanism of claim 5 wherein the means for rotating the tilt gimbal further includes a circuit board mounted proximate the tilt gear and a circuit for driving the motor, the circuit and the at least one magnetic sensor being mounted on the board.

8. The mechanism of claim 1 further comprising means, mounted inside the car, for displaying a video signal generated by the imaging system.

9. The mechanism of claim 8 further comprising means for storing the video signal generated by the imaging system.

\* \* \* \* \*